United States Patent [19]

Wetherington

[11] Patent Number: 4,638,408

[45] Date of Patent: Jan. 20, 1987

[54] AUTOMOBILE HEADLIGHT-FOG LIGHT COMBINATION

[76] Inventor: Aubrey D. Wetherington, Rte. 1, Box 181, Hahira, Ga. 31632

[21] Appl. No.: 625,833

[22] Filed: Jun. 28, 1984

[51] Int. Cl.[4] .................... B60Q 1/00

[52] U.S. Cl. .................... 362/61; 362/211; 362/214

[58] Field of Search .................... 362/214, 211, 285, 310, 362/311, 346, 360, 61, 80, 293, 343

[56] References Cited

U.S. PATENT DOCUMENTS

| | | | |
|---|---|---|---|
| 1,280,626 | 10/1918 | Ames | 362/214 |
| 1,923,181 | 8/1933 | Albers | 362/214 |
| 2,273,951 | 2/1942 | Gibb | 362/61 |
| 2,277,685 | 3/1942 | Bergström | 362/214 |
| 3,818,210 | 6/1974 | Pitkjaan | 362/61 |
| 4,225,903 | 9/1980 | Buchleitner | 362/61 |

FOREIGN PATENT DOCUMENTS

| | | | |
|---|---|---|---|
| 543486 | 2/1932 | Fed. Rep. of Germany | 362/214 |
| 753358 | 10/1952 | Fed. Rep. of Germany | 362/214 |
| 0027678 | 4/1924 | France | 362/211 |

*Primary Examiner*—Carl Stuart Milles
*Attorney, Agent, or Firm*—Arthur G. Yeager

[57] ABSTRACT

An automobile headlight and fog light combination having a generally parabolic reflector and a transparent lens with a segment along the bottom of the lens tinted to function as a fog light for any light transmitted therethrough, said headlight have a first filament for a high bright beam, a second filament for a low dim beam and a third filament for a fog light beam, substantially all the light from said third filament passing through said tinted segment of said lens.

2 Claims, 7 Drawing Figures

AUTOMOBILE HEADLIGHT-FOG LIGHT COMBINATION

BACKGROUND OF THE INVENTION

The use of headlights and fog lights on automobiles is well known. They have, however, been incorporated in two separate sets of lights, one of which provides the white light for the high, bright beam and the low, dim beam, and another set of lights provides the amber or yellow fog light. Attempts to combine these in a single set of headlights has not been successful. Substantially all of such attempts have involved an attachable-detachable cover to convert a headlight into a fog light by attaching a tinted cover to the headlight when a fog light is desired. In U.S. Pat. No. 2,273,951 there is an integral light assembly with a single lens divided into three horizontal zones to provide both fog light and normal driving light. The top and bottom zones of the lens are tinted yellow and the central zone is untinted. This arrangement merely provides a mixture of yellow and white light and does not provide the driver with a selection of one or the other.

It is an object of this invention to provide an improved headlight which can selectively function as a fog light. It is another object of this invention to provide an improved combination light having three selected emissions. A further object of this invention is to increase automobile safety by the availability of an integral headlight-fog light combination built into the automobile.

BRIEF DESCRIPTION OF THE INVENTION

This invention relates to an automobile headlight having a generally parabolic reflector and a transparent lens having a segment thereof at the bottom of the lens tinted to function as a fog light, said headlight having a first filament for a bright light beam, a second filament for a dim light beam and a third filament for a fog light beam, substantially all the light from said third filament being directed through said tinted segment.

In a specific embodiment the third filament is shielded so as to project substantially all its emitted light onto the parabolic reflector and thence through the tinted segment of the lens.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
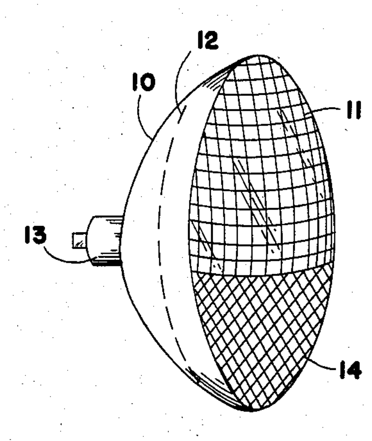
FIG. 1 is a schematic illustration of a sealed beam headlight with the lower portion of the lens tinted for use as a fog light.
Figure 2:
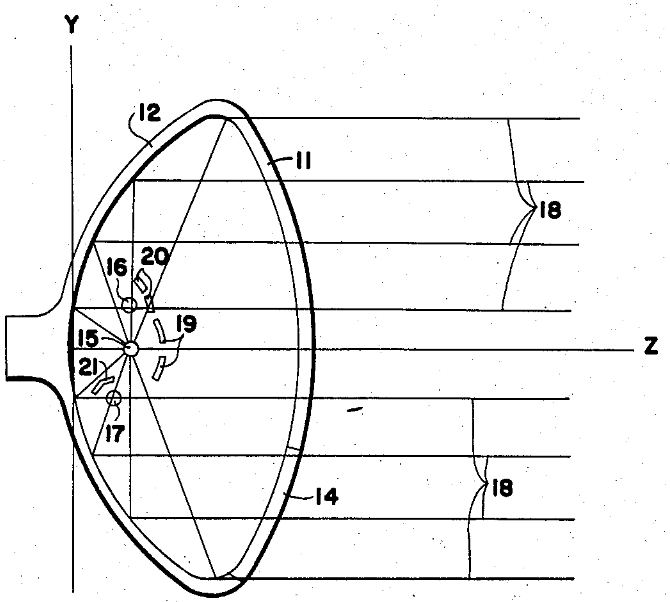
FIG. 2 is a vertical cross section through a headlight showing the position of the high beam filament and the light emitted therefrom.

In FIG. 1 there are shown the general features of a sealed beam headlight 10 for an automobile. The headlight 10 has a lens 11, a reflector 12, filaments (not shown) to produce light and a connection plug 13 to mate with a receptacle in the automobile so that the entire unit may be easily replaced when necessary. In accordance with this invention the lower portion 14 of lens 11 is tinted, preferably amber, to function as a fog light.

In FIGS. 2, 3, 4, and 5 there are schematic simplified views of the lens 11, reflector 12 and the light producing filaments 15, 16, and 17 with their associated shields and reflectors 19, 20, and 21, respectively. Each of FIGS. 2, 3, 4, and 5 is shown with respect to geometrical axes x, y, and z for purposes of locating filament 17 with respect thereto.

Reflector 12 is formed in the shape of a paraboloid with filament 15 at the focus of the paraboloid. As is well known, light from the focus will be reflected from reflector 12 as parallel rays 18 passing through lens 11 and continuing outwardly in that direction. For the purpose of obtaining the brightest light ahead of an automobile the high beam filament 15 is placed at the focus of the parabolic reflector 12. As shown in FIGS. 2, 3, 4, and 5 the filament is along the z-axis and well known mathematical relationships can be used to determine the exact distance the focus is from the origin (intersection of x-, y-, and z-axes) when the x-y plane is tangent to reflector 12. In the modern construction of a sealed beam headlight, there is incorporated a reflecting shield 19 to cause any light from filament 15 that might radiate toward lens 11 to be reflected against reflector 12 so as to be directed through lens 11 as parallel rays 18. Without the incorporation of reflecting shield 19 some portion of the light from filament 15 would pass through lens 11 diverging as nonparallel rays, which is not desired for optimum headlight operation. A modern sealed beam headlight also includes a low beam filament 16 which is so placed as to cause the reflected light to pass through lens 11 as rays 22 directed downwardly. These rays 22 do not penetrate as great a distance ahead of the automobile as parallel rays 18 from high beam filament 15, but rather are directed downwardly on the roadway to illuminate it and to minimize the light that would be directed at automobiles travelling in the opposite direction on a roadway. Filament 16 may also have a reflecting shield 20 to prevent divergent rays from passing through lens 11 when filament 16 is employed. This invention is not concerned with the presence of or the location of filaments 15 and 16 and their respective reflector shields 19 and 20 since they are known parts of commercial products now on the market.

Figure 4:
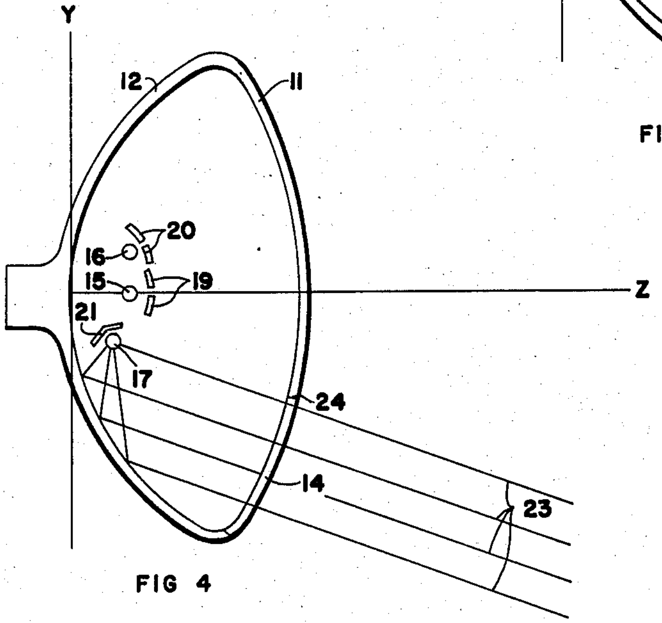
FIG. 4 is a vertical cross-section as in FIG. 3 showing the light filament and the light emitted therefrom.
Figure 5:
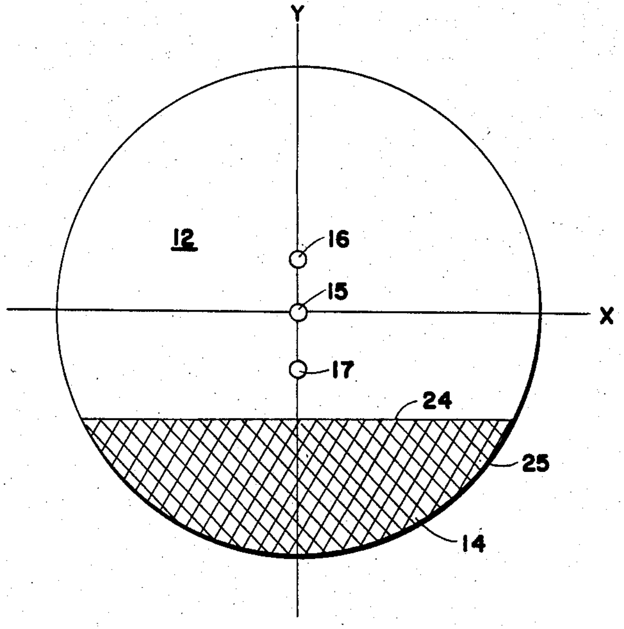
FIG. 5 is a front elevational view showing the positioning of all three filaments.

In FIGS. 4 and 5 there are shown the location of filament 17 and its reflector shield 21 which directs light from filament 17 such that it will pass with or without reflection from reflector 12 through tinted portion 14 of lens 11. Portion 14 approximates a segment of a circle as seen in FIG. 5 in that it is the lower section bounded by chord 24 and circumference 25. The actual surface of portion 14 will be somewhat spherical in some headlights because of the convex nature of lens 11. In other headlights that have a rectangular appearance when viewed from the front, portion 14 will assume a correspondingly rectangular shape. In any event it is the purpose of this invention to have a tinted portion on the lower part of lens 11 and to place filament 17 and reflector shield 21 in a location such that substantially all light from filament 17 will pass through tinted portion 14 and substantially no light will pass through the upper portion of lens 11 above line 24.

Figure 3:
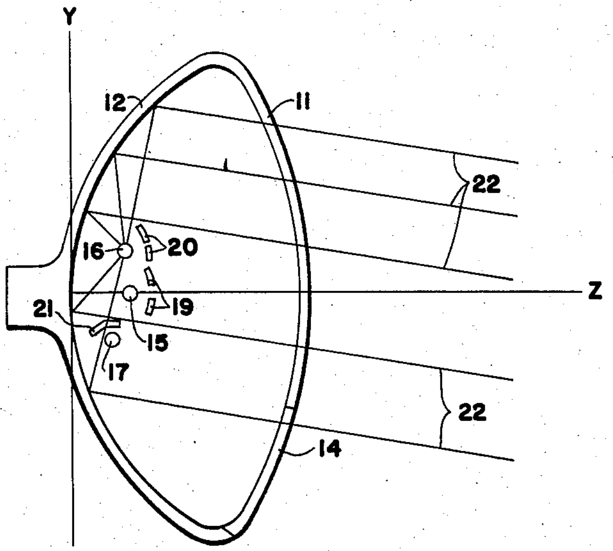
FIG. 3 is a vertical cross-section as in FIG. 2 showing the low beam filament and the light emitted therefrom.
Figure 6:
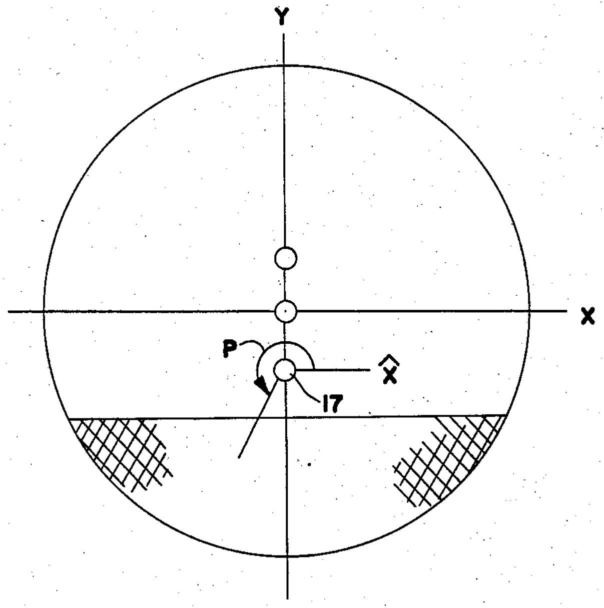
FIG. 6 is a cross-section similar to FIG. 2 showing mathematical symbols for use in determining the position of the fog light filament.
Figure 7:
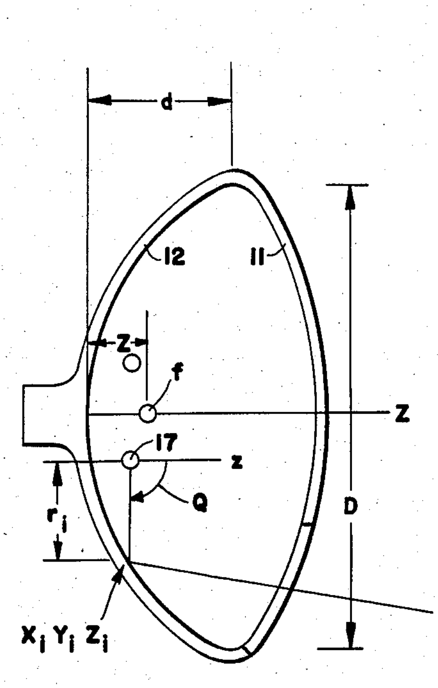
FIG. 7 is a front elevational view showing mathematical symbols for use in determing the position of the fog light filament.

The determination of exactly where to locate filament 17 is given below with respect to the three dimensional axes x, y, and z as shown on FIGS. 3–5 where the z-axis is the axis of revolution of the paraboloid and the origin of the axes is where the parabola intersects the axis of revolution. In this mathematical derivation the following definitions apply as graphically depicted in FIGS. 6 and 7.

- 17=fog light filament
- D=diameter of lens 11
- d=distance from lens 11 to reflector 12 along z-axis
- P=angle of light ray emitted from filament 17 with respect to x-axis
- Q=angle of light ray emitted from filament 17 with respect to z-axis
- $x_2$, $y_2$, $z_2$=position of filament 17
- $x_i$, $y_i$, $z_i$=position where light ray from filament 17 strikes reflector 12
- $x_r$, $y_r$, $z_r$=position of light ray after reflection from $x_i$, $y_i$, $z_i$
- $r_i$=distance from filament 17 to $x_i$, $y_i$, $z_i$
- f=focus of parabola
- $z_o$=distance from origin to f
- A, B, C, E, F=Geometrical factors derived from the law of reflection.

The focus of the parabola is known to be located along the z-axis at a distance $z_o$ from the origin as follows:

$$z_o = D^2/16d$$

The location of filament 17 is derived as follows:

$$r_i = \frac{\cos Q - \frac{8d}{D^2}\sin Q(x_2\cos P + y_2\cos P)}{\frac{8d}{D^2}\sin^2 Q} + \frac{\left\{\left[\cos Q - \frac{8d}{D^2}\sin Q(x_2\cos P + y_2\sin P)\right]^2 + \frac{16d}{D^2}\sin^2 Q\left[z_2 - \frac{4d}{D^2}(x_2^2 + y_2^2)\right]\right\}^{\frac{1}{2}}}{\frac{8d}{D^2}\sin^2 Q}$$

Rays from filament 17 strike reflector 12 at the position:

$x_i = x_2 + r_i \sin Q \cos P$ $y_i = y_2 + r_i \sin Q \sin P$ $z_i = z_2 + r_i \cos Q$ provided $z_i$ is not greater than d.

After the ray hits reflector 12 at $x_i$, $y_i$, $z_i$ and is reflected toward lens 11 the vertical and horizontal positions of that reflected ray can be calculated as follows at any selected distance $z_r$ from the origin:

<u>Vertical Position</u>

-continued $$y_r = y_i + (z_r - z_i)\left[\frac{-B - (B^2 - AC)^{\frac{1}{2}}}{A}\right]$$

<u>Horizontal Position</u>

$$x_r = x_i + (z_r - z_r)\left\{E\left[\frac{-B - (B^2 - AC)^{\frac{1}{2}}}{A}\right] + F\right\}$$

where $$A = \frac{\left(\sin Q\cos P - \frac{8d}{D^2}x_i\cos Q\right)^2}{\left(\sin Q\sin P - \frac{8d}{D^2}y_i\cos Q\right)^2}\left[\left(\frac{8d}{D^2}x_i\right)^2 - \left(\frac{8d}{D^2}x_i\sin Q\cos P + \frac{8d}{D^2}y_i\sin Q\cos P - \cos Q\right)^2\right] +$$

$$2\left(\frac{8d}{D^2}x_i\right)\left(\frac{8d}{D^2}y_i\right)\frac{\left(\sin Q\cos P - \frac{8d}{D^2}x_i\cos Q\right)}{\left(\sin Q\sin P - \frac{8d}{D^2}y_i\cos Q\right)} +$$

$$\left(\frac{8d}{D^2}y_i\right)^2 - \left(\frac{8d}{D^2}x_i\sin Q\cos P + \frac{8d}{D^2}y_i\sin Q\sin P - \cos Q\right)^2$$

$$B = \frac{\left(\sin Q\cos P - \frac{8d}{D^2}x_i\cos Q\right)}{\left(\sin Q\sin P - \frac{8d}{D^2}y_i\cos Q\right)^2}\left(\frac{8d}{D^2}\sin Q\right)(x_i\sin P - y_i\cos P)\left[\left(\frac{8d}{D^2}x_i\right)^2 - \left(\frac{8d}{D^2}x_i\sin Q\cos P + \frac{8d}{D^2}y_i\sin Q\sin P - \cos Q\right)^2\right] +$$

$$\left(\frac{8d}{D^2}x_i\right)\left(\frac{8d}{D^2}y_i\right)\frac{\frac{8d}{D^2}\sin Q(x_i\sin P - y_i\cos P)}{\left(\sin Q\sin P - \frac{8d}{D^2}y_i\cos Q\right)} -$$

$$\left(\frac{8d}{D^2}x_i\right)\frac{\left(\sin Q\cos P - \frac{8d}{D^2}x_i\cos Q\right)}{\left(\sin Q\sin P - \frac{8d}{D^2}y_i\cos Q\right)} - \frac{8d}{D^2}y_i$$

-continued $$C = \left(\frac{8d}{D^2}\sin Q\right)^2 \frac{(x_i\sin P - y_i\cos P)^2}{\left(\sin Q\sin P - \frac{8d}{D^2}y_i\cos Q\right)^2}\left[\left(\frac{8d}{D^2}x_i\right)^2 - \left(\frac{8d}{D^2}x_i\sin Q\cos P + \frac{8d}{D^2}y_i\sin Q\sin P - \cos Q\right)^2\right] - 2\left(\frac{8d}{D^2}x_i\right)\left(\frac{8d}{D^2}\sin Q\right)(x_i\sin P - y_i\cos P) + 1 - \left(\frac{8d}{D^2}x_i\sin Q\cos P + \frac{8d}{D^2}y_i\sin Q\sin P - \cos Q\right)^2$$

$$E = \frac{\sin Q\cos P - \frac{8d}{D^2}x_i\cos Q}{\sin Q\sin P - \frac{8d}{D^2}y_i\cos Q}$$

$$F = \frac{\frac{8d}{D^2}\sin Q(x_i\sin P - y_i\cos P)}{\sin Q\sin P - \frac{8d}{D^2}y_i\cos Q}$$

Under the above equations let $z_r = d$ to determine where light ray is as it passes through lens 11. By proper selections the postion of filament 17 can be located to cause all reflected light rays to pass through tinted portion 14 below line 24.

The tinted portion 14 of lens 11 should be large enough to provide adequate lighting in foggy conditions and yet should be small enough so as not to interfere with the high beam rays. Generally line 24 is horizontal and the portion 14 below that line is not more than about one-third of the total area of lens 11.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. An automobile headlight having a parabolic reflector and a transparent lens with a segment at the bottom of the lens tinted to cause the light passing therethrough to function as a fog light, said headlight having a high beam filament positioned substantially at the focus of the parabolic reflector, a low beam filament positioned above said high beam filament and so as to direct light against said reflector to reflect light in a downward direction, and a fog light filament positioned below said high beam filament and having a reflector shield positioned above and rearward of said fog light filament so as to direct substantially all light from said filament through said reflector such that the light reflected therefrom will pass through said tinted segment.

2. The headlight of claim 1 wherein said segment comprises the surface of said headlight lens below a substantially horizontal line in the lower portion of said lens and wherein said segment area is not more than about one-third of the entire area of said lens.

* * * * *